(12) United States Patent
Luo et al.

(10) Patent No.: US 11,468,264 B2
(45) Date of Patent: Oct. 11, 2022

(54) SUBSTANCE INGREDIENT DETECTION METHOD AND APPARATUS, AND DETECTION DEVICE

(71) Applicant: BEIJING CLOUDOPTEK TECHNOLOGY CO., LTD., Beijing (CN)

(72) Inventors: Lei Luo, Shenzhen (CN); William Xiao-qing Huang, Shenzhen (CN)

(73) Assignee: BEIJING CLOUDOPTEK TECHNOLOGY CO., LTD., Beijing (CN)

( * ) Notice: Subject to any disclaimer, the term of this patent is extended or adjusted under 35 U.S.C. 154(b) by 894 days.

(21) Appl. No.: 16/320,086

(22) PCT Filed: Jun. 12, 2017

(86) PCT No.: PCT/CN2017/087942
§ 371 (c)(1),
(2) Date: Jan. 23, 2019

(87) PCT Pub. No.: WO2018/227338
PCT Pub. Date: Dec. 20, 2018

(65) Prior Publication Data
US 2019/0272449 A1   Sep. 5, 2019

(51) Int. Cl.
*G06K 9/62*   (2022.01)
*G06N 20/00*   (2019.01)
(Continued)

(52) U.S. Cl.
CPC ........... *G06K 9/6257* (2013.01); *G01N 21/01* (2013.01); *G01N 21/35* (2013.01); *G01N 21/65* (2013.01);
(Continued)

(58) Field of Classification Search
CPC .... G06K 9/6257; G06K 9/6218; G06N 20/00; G06N 7/005; G01N 21/01; G01N 2021/0137; G01N 2021/0181
See application file for complete search history.

(56) References Cited

U.S. PATENT DOCUMENTS 5,926,773 A * 7/1999 Wagner ................ G01N 21/359
   702/22
6,035,246 A * 3/2000 Wagner ..................... G01J 3/28
   250/339.05

(Continued)

FOREIGN PATENT DOCUMENTS

CN   101206463 A   6/2008
CN   101403696 A   4/2009
(Continued)

OTHER PUBLICATIONS

Madden, Michael G., and Alan G. Ryder. "Machine learning methods for quantitative analysis of Raman spectroscopy data." Opto-Ireland 2002: Optics and Photonics Technologies and Applications. vol. 4876. SPIE, 2003. (Year: 2003).*

(Continued)

*Primary Examiner* — Utpal D Shah
(74) *Attorney, Agent, or Firm* — Tucker Ellis LLP

(57) ABSTRACT

The embodiment of the present application relates to the field of substance ingredient detection, for example, relates to a substance ingredient detection method and apparatus, and a detection device. The method includes: obtaining spectral information of a substance to be detected; and matching the spectral information with a pre-obtained prediction model based on a machine learning algorithm to obtain the ingredients of the substance to be detected. In the embodiment of the present application, the spectral information of the substance to be detected is obtained, and then the spectral information is matched with the prediction model based on the machine learning algorithm to obtain the prediction result of the ingredients of the substance to be detected. In the embodiment of the present application, the machine learning algorithm is combined with spectral recognition, the traditional algorithm is abandoned, the recog- (Continued)

nition speed is improved, and the substance detection efficiency is greatly improved.

6 Claims, 6 Drawing Sheets

(51) Int. Cl.
    *G06N 7/00*         (2006.01)
    *G01N 21/01*      (2006.01)
    *G01N 21/35*      (2014.01)
    *G01N 21/65*      (2006.01)
    *G01N 21/31*      (2006.01)

(52) U.S. Cl.
    CPC .......... *G06K 9/6218* (2013.01); *G06N 7/005* (2013.01); *G06N 20/00* (2019.01); *G01N 2021/0137* (2013.01); *G01N 2021/0181* (2013.01); *G01N 2021/3129* (2013.01); *G01N 2201/1296* (2013.01)

(56) References Cited

U.S. PATENT DOCUMENTS

| | | | | |
|---|---|---|---|---|
| 7,181,348 B2* | 2/2007 | Wishart | ............. | G01R 33/4625 702/30 |
| 8,054,454 B2* | 11/2011 | Treado | ............. | G01J 3/02 356/73 |
| 8,271,209 B2* | 9/2012 | Dasaratha | ............. | G16C 20/20 702/27 |
| 9,103,714 B2* | 8/2015 | Treado | ............. | G01J 3/02 |
| 10,677,713 B1* | 6/2020 | Yap | ............. | G01N 21/39 |
| 2009/0043514 A1* | 2/2009 | Schweitzer | ............. | G01N 21/64 702/23 |
| 2013/0325760 A1* | 12/2013 | Liu | ............. | G06N 20/00 706/12 |
| 2016/0178618 A1* | 6/2016 | Freyer | ............. | C12M 25/16 435/7.1 |

FOREIGN PATENT DOCUMENTS

| | | |
|---|---|---|
| CN | 101915744 A | 12/2010 |
| CN | 102590175 A | 7/2012 |
| CN | 102608284 A | 7/2012 |
| CN | 103217411 A | 7/2013 |
| CN | 104182251 A | 12/2014 |
| CN | 106770013 A | 5/2017 |
| WO | 2012045396 A2 | 4/2012 |

OTHER PUBLICATIONS

International Search Report from corresponding International Patent Application No. PCT/CN2017/087942, dated Mar. 9, 2018, 12 pages.

\* cited by examiner

SUBSTANCE INGREDIENT DETECTION METHOD AND APPARATUS, AND DETECTION DEVICE

FIELD OF THE INVENTION

Embodiments of the present application relate to the field of substance ingredient detection, for example, relate to a substance ingredient detection method and apparatus, and a detection device.

BACKGROUND OF THE INVENTION

In recent years, the application of substance detection devices has become more and more extensive, including the detection of suspicious objects in security inspection, the detection of pharmaceutical ingredients by the Food and Drug Administration, the explosion site investigation of chemical defense troops, and other professional fields, and also including the detection of pesticide residues, the detection of presence of melamine, the detection of waste oil and real and fake wine and other civilian use fields, and the substance detection devices are especially widely used in the field of food safety. The existing detection devices, such as a Raman detection terminal, adopt a Raman spectroscopy method to detect substance ingredient more quickly and accurately.

In the process of implementing the present application, the inventors have found that at least the following problems exist in the related art: when mixture detection is performed by using the Raman detection terminal, due to the limitation of the algorithm and the computing power of the device, the detection process is slow and the efficiency is low.

SUMMARY OF THE INVENTION

One object of the embodiment of the present application is to provide a new substance ingredient detection method and apparatus, and a detection device, in order to quickly detect the ingredients of a mixture when detecting the ingredients of the mixture.

In a first aspect, the embodiment of the present application provides a substance ingredient detection method applied to a detection device, the method including: obtaining spectral information of a substance to be detected; and matching the spectral information with a pre-obtained prediction model based on a machine learning algorithm to obtain the ingredients of the substance to be detected, wherein the prediction model based on the machine learning algorithm is formed by inputting the spectral information of multiple kinds of substances and the ingredients of the substances for training.

In a second aspect, the embodiment of the present application further provides a substance ingredient detection apparatus applied to a detection device, the apparatus including:

a spectrum measurement module, used for obtaining spectral information of a substance to be detected; and a substance ingredient obtaining module, used for matching the spectral information with a pre-obtained prediction model based on a machine learning algorithm to obtain the ingredients of the substance to be detected, wherein the prediction model based on the machine learning algorithm is formed by inputting the spectral information of multiple kinds of substances and the ingredients of the substances for training.

In a third aspect, the embodiment of the present application further provides a detection device, including:

at least one processor; and a memory in communication connection with the at least one processor; wherein the memory stores instructions executable by the at least one processor, and the instructions are executed by the at least one processor to enable the at least one processor to execute the method described above.

According to the substance ingredient detection method and apparatus, and the detection device provided by the embodiment of the present application, by obtaining the spectral information of the substance to be detected, and then matching the spectral information with the prediction model based on the machine learning algorithm, as the prediction model based on the machine learning algorithm is formed by inputting the spectral information of multiple kinds of substances and the ingredients of the substances for training, therefore the spectral information of the substance to be detected is matched with the prediction model based on the machine learning algorithm to obtain a prediction result of the ingredients of the substance to be detected. In the embodiment of the present application, the machine learning algorithm is combined with spectral recognition, the traditional algorithm is abandoned, the recognition speed is improved, and the substance detection efficiency is greatly improved.

BRIEF DESCRIPTION OF THE DRAWINGS

One or more embodiments are exemplified by figures in corresponding drawings, these exemplary illustrations do not constitute limitations to the embodiments, elements with the same reference signs are expressed as similar elements, and the figures in the drawings constitute no scale limitation, unless specifically stated otherwise.

DETAILED DESCRIPTION OF THE EMBODIMENTS

In order that the purposes, technical solutions and advantages of the present application are clearer, a clear and complete description of technical solutions in the embodiments of the present application will be given below, in combination with the drawings in the embodiments of the present application. Apparently, the embodiments described below are merely a part, but not all, of the embodiments of the present application. All of other embodiments, obtained by those of ordinary skill in the art based on the embodiments of the present application without any creative effort, fall into the protection scope of the present application.

Figure 1A:
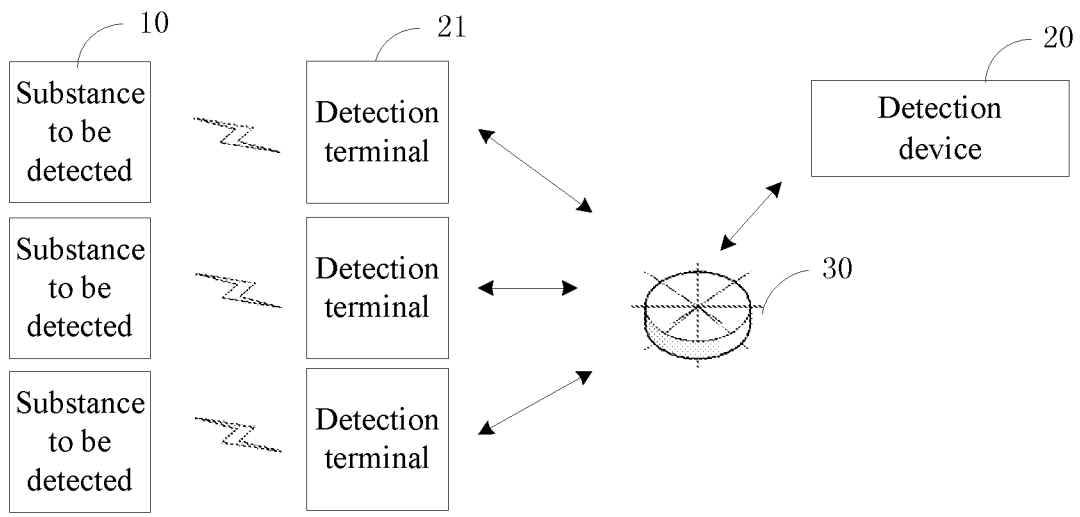
FIG. 1A is a schematic diagram of an application scenario of a method and apparatus of the present application.
Figure 1B:
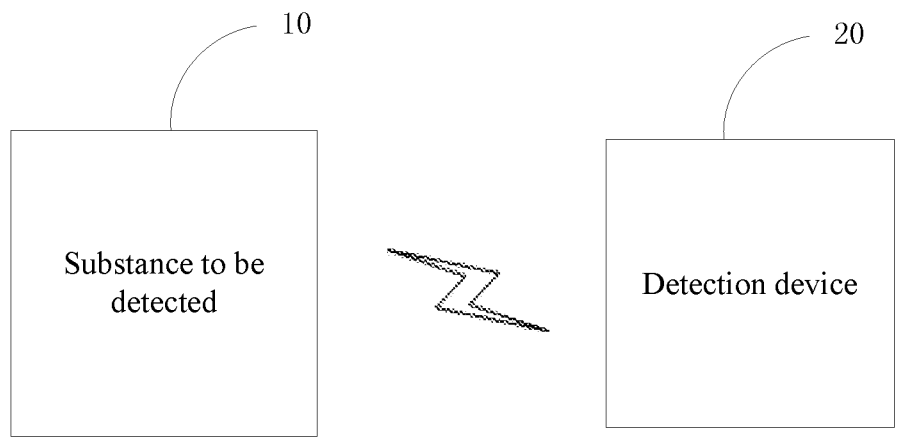
FIG. 1B is a schematic diagram of an application scenario of a method and apparatus of the present application.

The embodiment of the present application provides a substance ingredient detection solution based on a machine learning algorithm, which is applicable to the application scenarios as shown in FIG. 1A and FIG. 1B. In the application scenario as shown in FIG. 1A, a substance 10 to be detected, a detection terminal 21 and a detection device 20 are included, wherein the detection terminal 21 is used for obtaining the spectral information of the substance 10 to be detected and then transmitting the spectral information of the substance 10 to be detected to the detection device 20. The detection device 20 is used for performing ingredient recognition on the spectral information of the substance 10 to be detected. The detection terminal 21 and the detection device 20 can communicate with each other through a network 30, wherein the network 30 can be, for example, a home or company local area network, or a specific network or the like. The detection terminal 21 and the detection device 20 have at least one network interface to establish a communication connection with the network 30. The detection device 20 can be a cloud server or other servers connected with the detection terminal 21 via the network. As shown in FIG. 1B, the detection device 20 can also integrate the functions of the detection terminal in the detection device 20, and the detection device 20 independently obtains the spectral information of the substance 10 to be detected from the substance 10 to be detected and obtains the ingredients of the substance to be detected through the spectral information.

The detection device 20 obtains a large amount of mixtures and spectral information corresponding to the mixtures via a single substance in a preset single substance spectrum library (the preset single substance spectrum library includes a plurality of single substances and corresponding spectral information) according to different ingredients and different proportions, then uses the ingredients of the large amount of mixtures and the spectral information of the mixtures as inputs, and performs model training based on a machine learning algorithm to obtain a prediction model based on the machine learning algorithm. The prediction model is based on the machine learning algorithm and the data of the spectral information and ingredients of the large amount of mixtures, therefore after the spectral information of the substance to be detected is obtained, and the spectral information is matched to the prediction model to obtain an ingredient prediction result of the substance to be detected. In the solution, the machine learning algorithm is combined with spectral recognition, the traditional algorithm is abandoned, the recognition speed is improved, and the substance detection efficiency is greatly improved.

It should be noted that, in an actual application process, the application scenario can further include more substances 10 to be detected, detection devices 20 and detection terminals 21.

Figure 2:
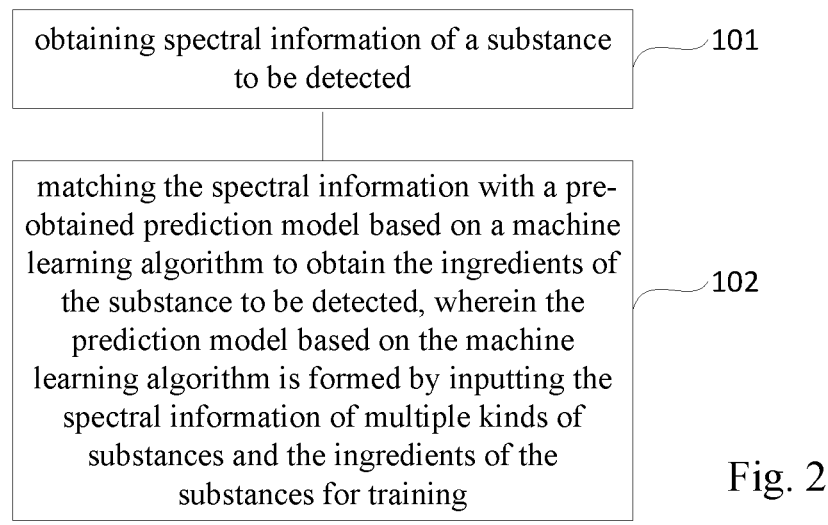
FIG. 2 is a flowchart of an embodiment of a detection method of the present application.

The embodiment of the present application provides a substance ingredient detection method, the substance ingredient detection method can be executed by the detection device 20 in FIG. 1A and FIG. 1B, and shown in FIG. 2, the substance ingredient detection method includes:

Step 101: obtaining spectral information of a substance to be detected; and the spectral recognition method in the embodiment of the present application can be a Raman spectral recognition method, an infrared spectral recognition method, or any other spectral recognition method, that is, the spectral information can be a Raman spectrum, an infrared spectrum, or the like.

Step 102: matching the spectral information with a pre-obtained prediction model based on a machine learning algorithm to obtain the ingredients of the substance to be detected, wherein the prediction model based on the machine learning algorithm is formed by inputting the spectral information of multiple kinds of substances and the ingredients of the substances for training.

The machine learning algorithm has a self-learning function, and uses the spectral information and ingredients of a large amount of different substances as inputs to train the prediction model, and the prediction model learns the ingredients of the substance based on the spectral information of the substance through the self-learning function.

Therefore, by matching the spectral information of the substance to be detected to the prediction model based on the machine learning algorithm, the prediction result of the ingredients of the substance to be detected can be obtained. The plurality of substances serving as the inputs can be single substances or mixtures. Considering that the objects in real life basically exist in the form of mixtures, only the spectral information of the mixture and the ingredients of the mixture are used as the input to perform the model training.

In practical applications, the returned prediction result of the substance to be detected may be one or more. When there are multiple prediction results, the probability of each prediction result needs to be confirmed. If the probability of a certain prediction result is the maximum and exceeds a preset threshold, the prediction result is confirmed as the ingredient of the substance to be detected; or otherwise, a common ingredient of a preset number of prediction results having relatively large probabilities in the respective prediction results as the ingredient of the substance to be detected.

For example, the returned prediction results are: y+a, y+b, y+c+d, . . . if the probability of y+a is the maximum and exceeds the preset threshold, the prediction result y+a can be directly used as the final result, that is, used as the ingredient of the substance to be detected.

If the probability of y+a is the maximum but the probability does not exceed the preset threshold, if the preset number is 3, and the probabilities of y+a, y+b and y+c+d are greater than those of other prediction results, then a common ingredient y of y+a, y+b and y+c+d is used as the final result.

In the embodiment of the present application, the machine learning algorithm is combined with spectral recognition, the traditional algorithm is abandoned, the recognition speed is improved, and the substance detection efficiency is greatly improved.

Figure 3:
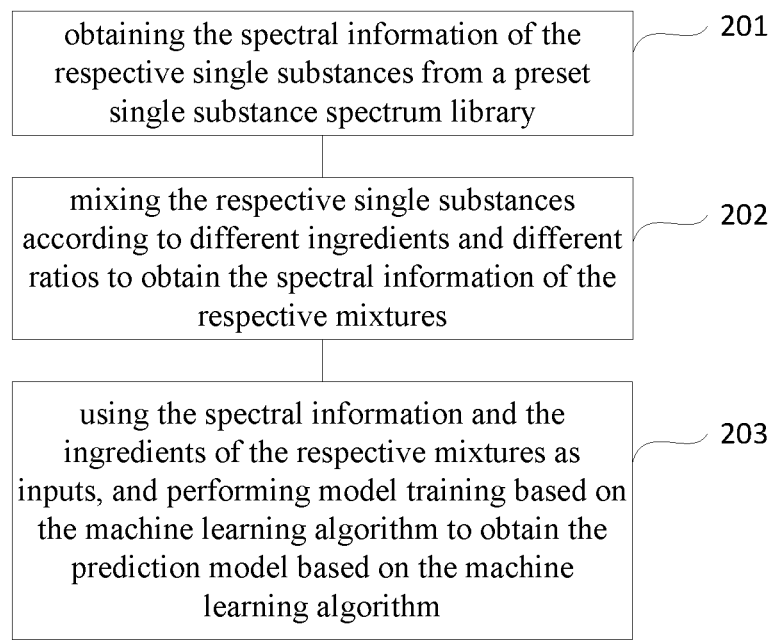
FIG. 3 is a flowchart of steps of pre-obtaining a prediction model based on a machine learning algorithm in an embodiment of a detection method of the present application.

In order to improve the accuracy of model prediction, the model training needs to be performed based on a large amount of data. Therefore, in the application, a single substance spectrum library containing a large number of single substances and their corresponding spectral information can be preset, a single substance is selected from the single substance spectrum library, and a mixture is formed according to different ingredients and different proportions to form a mixture to serve as the input so as to perform the model training. Referring to FIG. 3, when the detection device pre-obtains the prediction model based on the machine learning algorithm, the detection device executes the following steps:

Step 201: obtaining the spectral information of the respective single substances from the preset single substance spectrum library.

Figure 4:
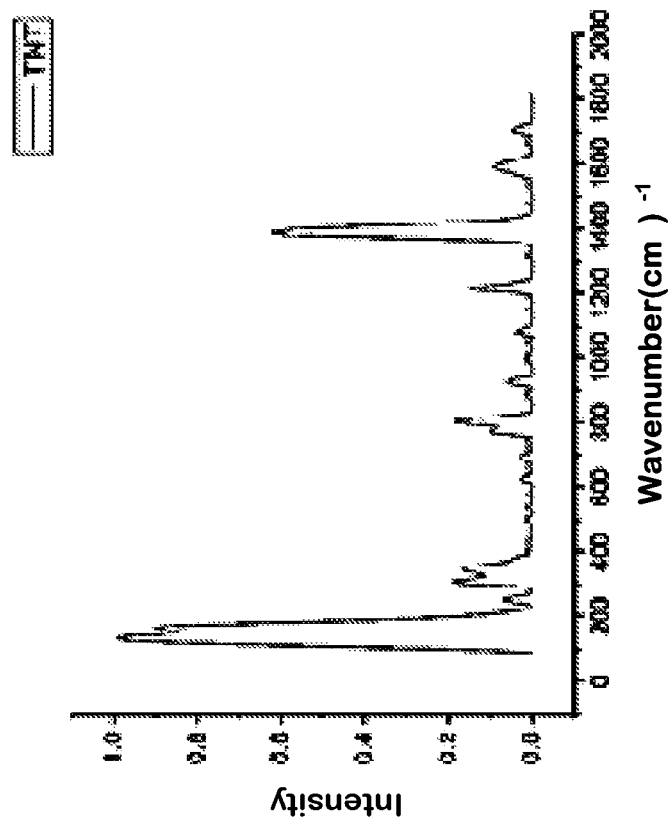
FIG. 4 is a schematic diagram of a Raman spectrum of the substance.
Figure 4:
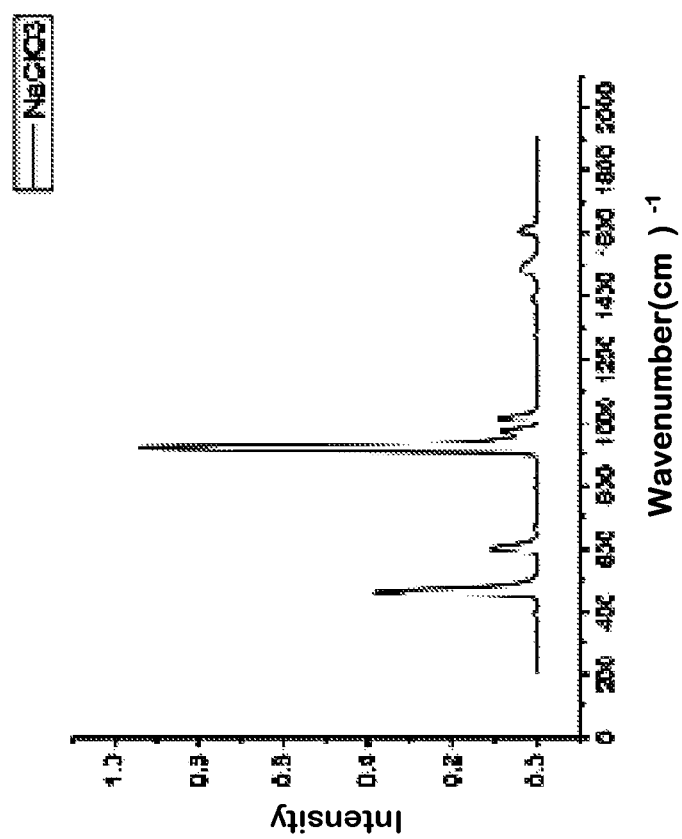

As shown in FIG. 4, it is a schematic diagram of Raman spectra of two kinds of powdery substances. In practical applications, the spectral information actually obtained by the detection device is a group of data corresponding to a spectral curve, and the examples are as follows:

| | |
|---|---|
| 0 | 0.002010 |
| 2 | 0.001219 |
| ... | |
| 1208 | 0.012633 |
| 1210 | 0.003053 |
| 1212 | 0.000525 |
| ... | |
| 1998 | 0.001028 |
| 2000 | 0.001232 |

The first number of each group corresponds to the horizontal coordinate and the second number corresponds to the vertical coordinate. Taking a Raman substance detection device as an example, the stepping of the horizontal coordinate is generally 2, and the horizontal coordinate generally adopts 1000-2000 points.

Step 202: mixing the respective single substances according to different ingredients and different ratios to obtain the spectral information of the respective mixtures.

The different ingredients are the types of the single substances contained in the mixture, the different ratios are relative contents of the single substances in the mixture, that is the proportion of each single substance in the mixture. The different ratios are for the mixtures having the same ingredient, that is, for the combination including the same type of single substances, and a group of mixtures is obtained according to different ratios of each single substance. In this way, for the mixture having the same ingredient, a large number of data having different ratios are used as inputs to perform the model training, which improves the accuracy of ingredient identification.

Step 203: using the spectral information and the ingredients of the respective mixtures as inputs, and performing model training based on the machine learning algorithm to obtain a prediction model based on the machine learning algorithm. The mixture obtained in the step 202 is used as the input, and the model training is performed based on the machine model algorithm. Wherein, the machine learning algorithm can adopt an artificial neural network algorithm. An artificial neural network is an algorithm developed according to the human cognition process. If we only have some inputs and corresponding outputs now, and the mechanism of how to get the outputs from the inputs is not clear, then we can consider the unknown process between the inputs and the outputs as a "network", the network is "trained" by continuously providing inputs and outputs for the network, the network constantly adjusts the weights between its nodes based on the inputs and the outputs to satisfy the inputs and the outputs. Thus, when the training is ended, we give an input, and the network will calculate an output based on its adjusted weight. This is the simple principle of the neural network.

In the embodiment of the present application, in order to identify the ingredients (outputs) of the mixtures according to the spectral information (inputs) of the mixtures, the spectral information and ingredients of a large number of different mixtures are input into the artificial neural network at first, and the network learns to identity the ingredients of the mixtures according to the spectral information of the mixtures through the self-learning function.

Specifically, in the step 202 of some embodiments of the method, all possible combinations of the respective single substances can be listed, and then the mixtures can be obtained based on different proportions, as follows:

Step 2021: obtaining possible combinations of the respective single substances in the preset single substance spectrum library, or obtaining the possible combinations of the single substances in which the combination category of the single substances does not exceed a preset threshold in the preset single substance spectrum library.

A mixture of all possible combinations of the single substances is obtained, for example, assuming that there are n kinds of substances in the single substance spectrum library, then the category of the mixture of all possible combinations of the single substances is $\Sigma_{x=2}^{n} C(n, x)$, wherein x is the category of the single substance in the mixture. In the practical applications, the mixing of too many substances is rare, or even if many substances are mixed actually, the user generally only cares about the first few kinds of ingredients having large contents, the ingredients with small contents do not necessarily make sense, so an upper limit xmax of the mixture category can be set, which is the preset threshold. Then, the category of the mixture of all possible combinations of the single substances is $\Sigma_{x=2}^{xmax} C(n, x)$, and the value of the preset threshold xmax can be set according to actual needs.

Step 2022: obtaining a plurality of mixing proportions of each combination according to the number of categories of the single substances in each combination and a preset step value.

That is, the mixtures of each category in the step 2021 are obtained as a group of mixtures with the same ingredients of different contents according to different contents of the contained single substances. It is assumed that x kinds of single substances are j1, j2 ... jx respectively, and their ratios are respectively set as z1%, z2% ... zx % according to a certain preset step value in an arrangement and combination mode. It is assumed that x is 3, then the initial z1, z2, and z3 can be set as 99.98, 0.01, 0.01; 99.97, 0.02, 0.01; ... , 99.97, 0.01, 0.02, and so on, and all possible arrangements and combinations are deduced, until the values of z1, z2 and z3 become 0.01, 0.01, 99.98. In the example, the preset step value is 0.01, and the preset stepp value can also be other values, this is not limited in the present application, the smaller the step value is, the more the trained samples are, and the longer the entire training time is.

Step 2023: obtaining a plurality of mixtures according to the possible combinations of the respective single substances and the plurality of mixing proportions of each combination.

step 2024: performing liner superposition on the spectral information of the respective ingredients of each mixture according to the mixing proportion to obtain the spectral information of the mixture.

Still using an example that the x kinds of single substances in the step 2022 are j1, j2 ... jx, the ratios of j1, j2 ... jx are z1%, z2% ... zx %, respectively, a vertical coordinate component value (i.e., the spectral intensity value) corresponding to a certain identical horizontal coordinate in the spectral information of the single substances j1, j2 ... jx is obtained respectively, the vertical coordinate component values (i.e. spectral intensity values) are added according to the mixing proportion (i.e., the ratio) to obtain a vertical coordinate value of the mixture at the horizontal coordinate point. For example, it is assumed that at the horizontal coordinate a1, the spectral intensity values of j1, j2 ... jx are b11, b12 ... b1x respectively, then the spectral intensity value of the mixture at the horizontal coordinate a1 is b11*z1%+b12*z2%+ ... +b1x *zx %. For example, the single substance 1 and the single substance 2 are mixed, the vertical coordinate of the single substance 1 at the horizontal coordinate 950 is 0.4, the vertical coordinate of the single substance 2 at the horizontal coordinate 950 is 0.2, and the ratio of the single substance 1 to the single substance 2 is 3:7, then it can be concluded that the vertical coordinate of the mixture at the horizontal coordinate 950 is 0.4 *30%+0.2 *70%=0.26. The Raman spectral information of the mixture can be obtained by finding the spectral intensity value of the vertical coordinate of the mixture for each point on the horizontal coordinate.

Further, in other embodiments of the method, the ratios of the respective ingredients in the substance to be detected can also be obtained according to the ingredients of the substance to be detected, including the following steps:

if the test result contains only one ingredient, then the ratio of the ingredient is 100%.

If the detection result judges that the substance to be detected includes at least two kinds of ingredients, the spectral information of the respective ingredients in the substance to be detected is obtained from the preset single substance spectrum library; and the ratio of the respective ingredients in the substance to be detected is obtained according to the spectral information of the substance to be detected and the spectral information of the respective ingredients in the substance to be detected.

That is, if the substance to be detected is a mixture including a plurality of single substances, the spectral data of the respective single substances is obtained from the single substance spectrum library, and the spectral data of the mixture is fitted to obtain the ratio of the respective single substances in the mixture. During the actual calculation, if the mixture includes x kinds of single substances, as long as x-1 horizontal coordinate points (the horizontal coordinate points with waves) with obvious features of the spectral data of the mixture are extracted, the ratio of the respective single substances can be obtained by solving a (x-1) elementary equation.

Figure 5:
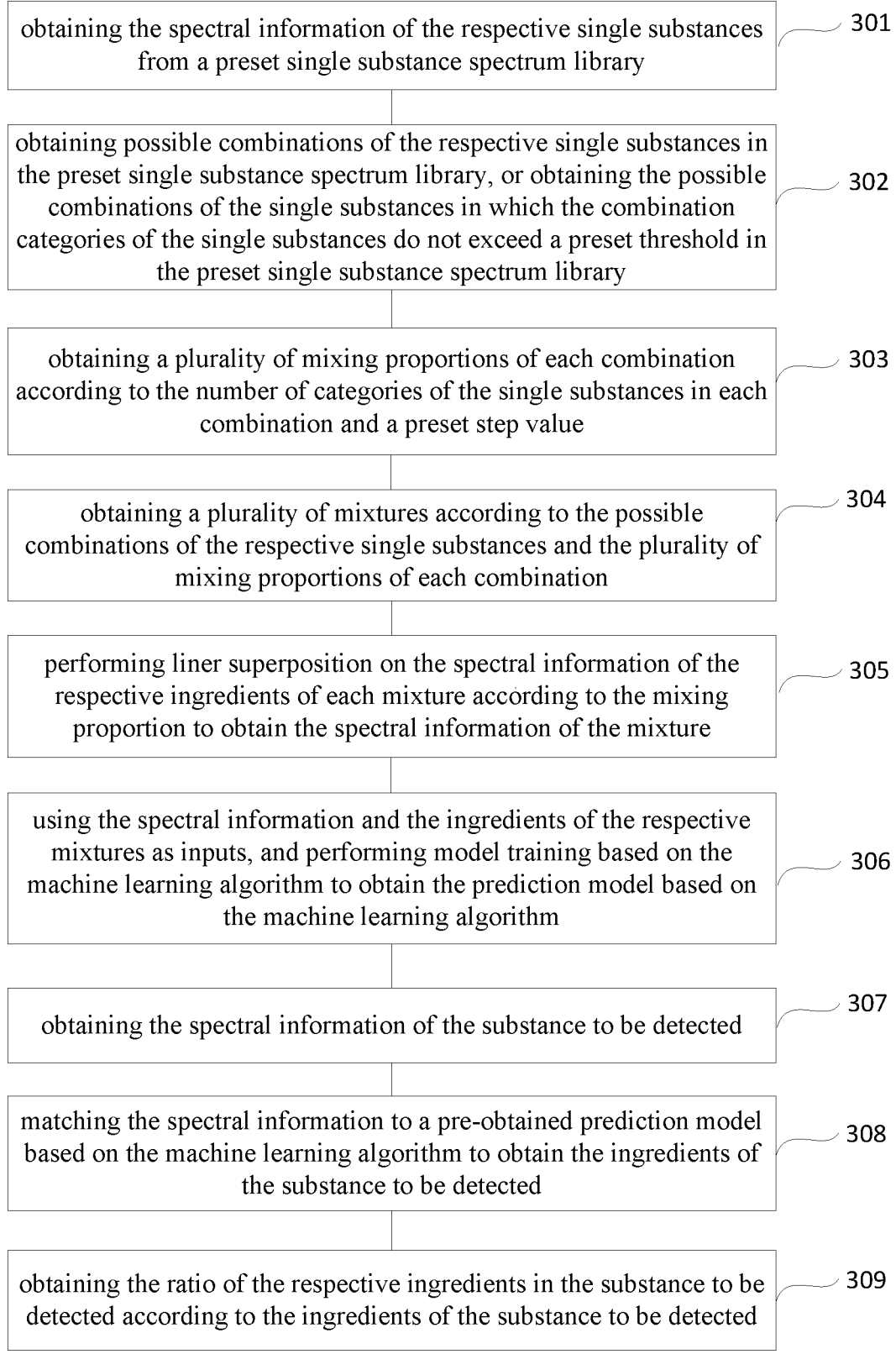
FIG. 5 is a flowchart of an embodiment of a detection method of the present application.

As shown in FIG. 5, it is a schematic flowchart of an embodiment of the method. In the embodiment, the method includes:

Step 301: obtaining the spectral information of the respective single substances from a preset single substance spectrum library;

step 302: obtaining possible combinations of the respective single substances in the preset single substance spectrum library, or obtaining the possible combinations of the single substances in which the combination categories of the single substances do not exceed a preset threshold in the preset single substance spectrum library;

step 303: obtaining a plurality of mixing proportions of each combination according to the number of categories of the single substances in each combination and a preset step value;

step 304: obtaining a plurality of mixtures according to the possible combinations of the respective single substances and the plurality of mixing proportions of each combination;

step 305: performing liner superposition on the spectral information of the respective ingredients of each mixture according to the mixing proportion to obtain the spectral information of the mixture;

step 306: using the spectral information and the ingredients of the respective mixtures as the inputs, and performing model training based on the machine learning algorithm to obtain a prediction model based on the machine learning algorithm;

step 307: obtaining the spectral information of the substance to be detected;

step 308: matching the spectral information to a pre-obtained prediction model based on the machine learning algorithm to obtain the ingredients of the substance to be detected; and step 309: obtaining the ratio of the respective ingredients in the substance to be detected according to the ingredients of the substance to be detected.

Figure 6:
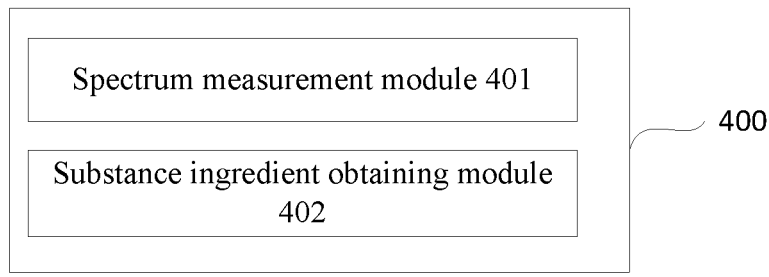
FIG. 6 is a structural schematic diagram of an embodiment of a detection apparatus of the present application.

Correspondingly, the embodiment of the present application further provides a substance ingredient detection apparatus applied to the detection device as shown in FIG. 1A or FIG. 1B, and shown in FIG. 6, the detection apparatus 400 includes:

a spectrum measurement module 401, used for obtaining spectral information of a substance to be detected; and a substance ingredient obtaining module 402, used for matching the spectral information with a pre-obtained prediction model based on a machine learning algorithm to obtain the ingredients of the substance to be detected, wherein the prediction model based on the machine learning algorithm is formed by inputting the spectral information of multiple kinds of substances and the ingredients of the substances for training.

In the embodiment of the present application, by obtaining the spectral information of the substance to be detected, and then matching the spectral information with the prediction model based on the machine learning algorithm, as the prediction model based on the machine learning algorithm is formed by inputting the spectral information of multiple kinds of substances and the ingredients of the substances for training, therefore the spectral information of the substance to be detected is matched with the prediction model based on the machine learning algorithm to obtain a prediction result of the ingredients of the substance to be detected. In the embodiment of the present application, the machine learning algorithm is combined with spectral recognition, the traditional algorithm is abandoned, the recognition speed is improved, and the substance detection efficiency is greatly improved.

Optionally, in other embodiments of the apparatus, the substance ingredient obtaining module is specifically used for:

matching the spectral information with the pre-obtained prediction model based on the machine learning algorithm to obtain respective prediction results of the ingredients of the substance to be detected and a probability corresponding to the prediction result;

if the probability of the prediction result is the maximum and exceeds a preset threshold, confirming the prediction result as the ingredient of the substance to be detected;

or otherwise, using a common ingredient of a preset number of prediction results having relatively large probabilities in the respective prediction results as the ingredient of the substance to be detected.

Figure 7:
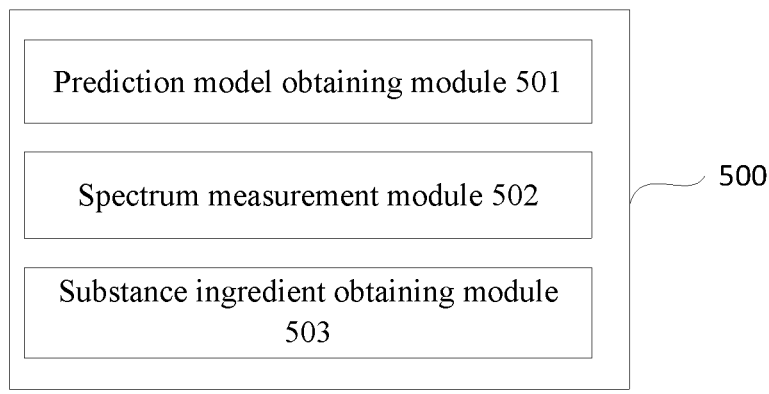
FIG. 7 is a structural schematic diagram of an embodiment of a detection apparatus of the present application.

Optionally, as shown in FIG. 7, in other embodiments of the apparatus, in addition to a spectrum measurement module 502 and a substance ingredient obtaining module 503, the detection apparatus 500 further includes:

a prediction model obtaining module 501, used for pre-obtaining the prediction model based on the machine learning algorithm;

the prediction model obtaining module 501 is specifically used for:

obtaining the spectral information of the respective single substances from a preset single substance spectrum library;

mixing the respective single substances according to different ingredients and different ratios to obtain the spectral information of the respective mixtures; and using the spectral information and the ingredients of the respective mixtures as inputs, and performing model training based on the machine learning algorithm to obtain the prediction model based on the machine learning algorithm.

Optionally, in some embodiments of the apparatus, the prediction model obtaining module is further used for:

obtaining possible combinations of the respective single substances in the preset single substance spectrum library, or obtaining the possible combinations of the respective single substances in which the combination categories of the single substances do not exceed a preset threshold in the preset single substance spectrum library;

obtaining a plurality of mixing proportions of each combination according to the number of categories of the single substances in each combination and a preset step value;

obtaining a plurality of mixtures according to the possible combinations of the respective single substances and the plurality of mixing proportions of each combination; and performing liner superposition on the spectral information of the respective ingredients of each mixture according to the mixing proportion to obtain the spectral information of the mixture.

Figure 8:
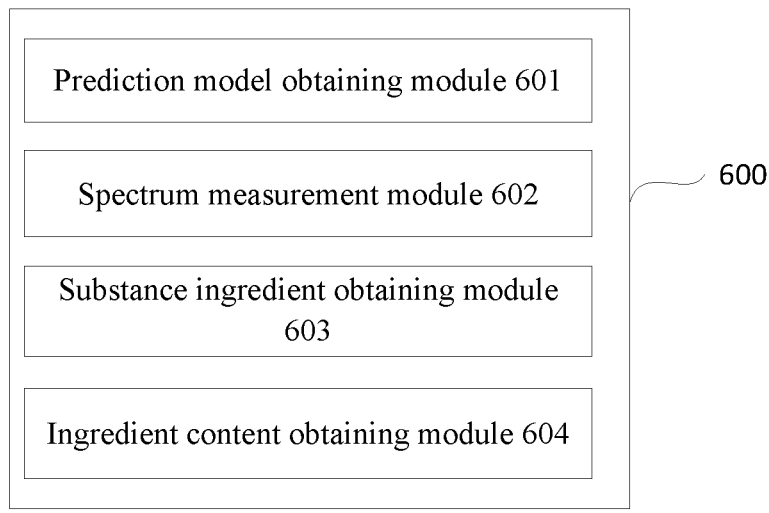
FIG. 8 is a structural schematic diagram of an embodiment of a detection apparatus of the present application.

Optionally, as shown in FIG. 8, in other embodiments of the apparatus, in addition to a prediction model obtaining module 601, a spectrum measurement module 602 and a substance ingredient obtaining module 603, the detection apparatus 600 further includes:

an ingredient content obtaining module 604, used for obtaining the ratio of each ingredient in the substance to be detected according to the ingredients of the substance to be detected; and the ingredient content obtaining module 604 is specifically used for:

if the substance to be detected includes at least two kinds of ingredients, obtaining the spectral information of the respective ingredients in the substance to be detected from the preset single substance spectrum library; and obtaining the ratio of the respective ingredients in the substance to be detected according to the spectral information of the substance to be detected and the spectral information of the respective ingredient in the substance to be detected.

Optionally, in some embodiments of the apparatus, the machine learning algorithm is an artificial neural network learning algorithm.

It should be noted that the foregoing detection apparatus can execute the detection method provided by the embodiment of the present application, and has the corresponding functional modules and beneficial effects of the execution method. With respect to technical details that are not described in detail in the embodiment of the detection apparatus, reference may be made to the detection method provided by the embodiment of the present application.

Figure 9:
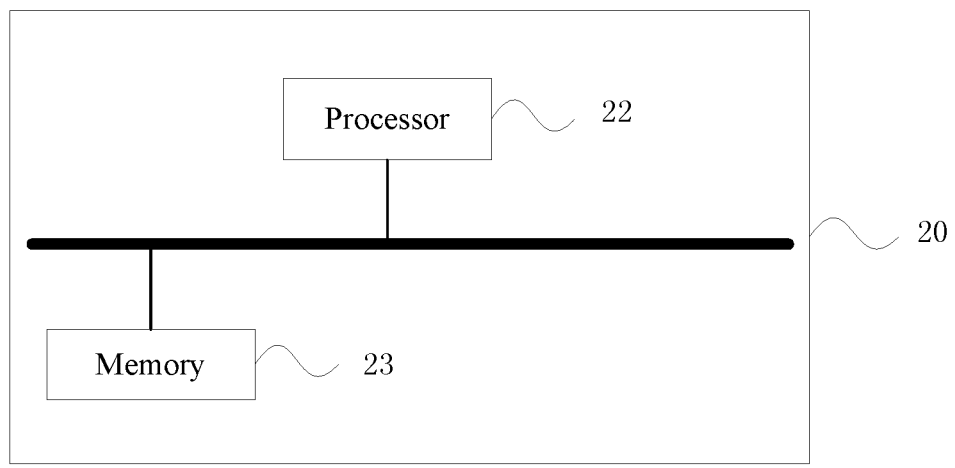
FIG. 9 is a schematic diagram of a hardware structure of a detection device provided by an embodiment of the present application.

FIG. 9 is a schematic diagram of a hardware structure of a detection device 20 provided by an embodiment of the present application. As shown in FIG. 9, the detection device 20 includes:

one or more processors 22 and a memory 23, wherein one processor 22 is used as an example in FIG. 9.

The processor 22 and the memory 23 can be connected through a bus or other mode, and a bus connection is used as an example in FIG. 9.

The memory 23 is used as a non-volatile computer readable storage medium, and can be used for storing non-volatile software programs, non-volatile computer executable programs and modules, such as program instructions/modules corresponding to the detection method in the embodiment of the present application (for example, the spectrum measurement module 401 and the substance ingredient obtaining module 402 as shown in FIG. 6). The processor 22 executes various functional applications and data processing of a server by running the non-volatile software programs, the instructions and the modules stored in the memory 23, that is, executes the detection method of the above method embodiment.

The memory 23 can include a program storage area and a data storage area, wherein the program storage area can store an operating system and an application program required for at least one function; and the data storage area can store data created according to use of the detection apparatus and the like. Further, the memory 23 can include a high speed random access memory, and can also include a nonvolatile memory, such as at least one magnetic disk storage device, a flash memory device, or other nonvolatile solid state storage devices. In some embodiments, the memory 23 can optionally include memories remotely arranged relative to the processor 22, and these remote memories can be connected to the detection apparatus through the network. The instance of the above network includes, but not limited to, the Internet, an enterprise intranet, a local area network, a mobile communication network, and combinations thereof.

The one or more modules are stored in the memory 23, and when being executed by the one or more processors 22, execute the detection method in any one of the above method embodiments, for example, execute the step 101 to the step 102 of the method as shown in FIG. 2, the step 201 to the step 203 in the method as shown in FIG. 3, and the step 301 to the step 309 in the method as shown in FIG. 5; and implement the functions of the modules 401-402 in FIG. 6 the modules 501-503 in FIG. 7 and modules 601-604 in FIG. 8.

The above product can implement the method provided by the embodiment of the present application, and have the corresponding functional modules and beneficial effects of the execution method. With respect to technical details that are not described in detail in the embodiment, reference may be made to the method provided by the embodiment of the present application.

The embodiment of the present application provides a non-volatile computer readable storage medium, the non-volatile computer readable storage medium stores computer executable instructions, the computer executable instructions are executed by one or more processors, for example, one processor 22 in FIG. 9, can cause the one or more processors to execute the detection method in any one of the above method embodiments, for example, execute the step 101 to the step 102 of the method as shown in FIG. 2, the step 201 to the step 203 in the method as shown in FIG. 3, and the step 301 to the step 309 in the method as shown in FIG. 5; and implement the functions of the modules 401-402 in FIG. 6 the modules 501-503 in FIG. 7 and modules 601-604 in FIG. 8.

The apparatus embodiments described above are merely exemplary, wherein units described as separate components can be separated physically or not, components displayed as units can be physical units or not, namely, can be located in one place, or can also be distributed on a plurality of network units. A part of or all the modules can be selected to achieve the purposes of the solutions in the embodiments according to actual demands.

By means of the descriptions of the above embodiments, those of ordinary skilled in the art can clearly understand that the embodiments can be implemented by software plus a necessary universal hardware platform, and of course, can be implemented by hardware. Those of ordinary skill in the art can understand that all or a part of the flows in the above method embodiments can be implemented with a computer program instructing corresponding hardware, the program can be stored in a computer readable storage medium, and when being executed, the program can include the flows of the above method embodiments. The storage medium can be a magnetic disk, an optical disk, a read-only memory (ROM), or a random access memory (RAM) or the like.

Finally, it should be noted that the above embodiments are merely used for illustrating the technical solutions of the present application, rather than limiting them; the technical features in the above embodiments or different embodiments can also be combined under the idea of the present application, the steps can be implemented in any order, and there are many other variations of the different aspects of the present application as described above, and for the sake of brevity, they are not provided in the details; although the present application has been described in detail with reference to the foregoing embodiments, those of ordinary skill in the art should understand that they could still make modifications to the technical solutions recorded in the foregoing embodiments or make equivalent substitutions to a part of technical features; and these modifications or substitutions do not make the essence of the corresponding technical solutions depart from the scope of the technical solutions of the embodiments of the present application.

The invention claimed is:

1. A substance ingredient detection method applied to a detection device, the method comprising:
   obtaining spectral information of a substance to be detected;
   matching the spectral information with a pre-obtained prediction model based on a machine learning algorithm to obtain the ingredients of the substance to be detected, wherein the prediction model based on the machine learning algorithm is formed by inputting the spectral information of multiple kinds of substances and the ingredients of the substances for training;
   pre-obtaining the prediction model based on the machine learning algorithm;
   pre-obtaining the prediction model based on the machine learning algorithm comprises:
   obtaining the spectral information of the respective single substances from a preset single substance spectrum library;
   mixing the respective single substances according to different ingredients and different ratios to obtain the spectral information of the respective mixtures; and
   using the spectral information and the ingredients of the respective mixtures as inputs, and performing model training based on the machine learning algorithm to obtain the prediction model based on the machine learning algorithm;
   wherein mixing the respective single substances according to different ingredients and different ratios to obtain the spectral information of the respective mixtures comprises:
   obtaining possible combinations of the respective single substances in the preset single substance spectrum library, or obtaining the possible combinations of the respective single substances in which the combination categories of the single substances do not exceed a preset threshold in the preset single substance spectrum library;
   obtaining a plurality of mixing proportions of each combination according to the number of categories of the single substances in each combination and a preset step value;
   obtaining a plurality of mixtures according to the possible combinations of the respective single substances and the plurality of mixing proportions of each combination; and
   performing liner superposition on the spectral information of the respective ingredients of each mixture according to the mixing proportion to obtain the spectral information of the mixture.

2. The method according to claim 1, further comprising: obtaining the ratio of the respective ingredients in the substance to be detected according to the ingredients of the substance to be detected; and
   obtaining the ratio of the respective ingredients in the substance to be detected according to the ingredients of the substance to be detected comprises:
   if the substance to be detected comprises at least two kinds of ingredients, obtaining the spectral information of the respective ingredients in the substance to be detected from the preset single substance spectrum library; and
   obtaining the ratio of the respective ingredients in the substance to be detected according to the spectral information of the substance to be detected and the spectral information of the respective ingredients in the substance to be detected.

3. The method according to claim 1, wherein matching the spectral information with a pre-obtained prediction model based on a machine learning algorithm to obtain the ingredients of the substance to be detected comprises:
   matching the spectral information with the pre-obtained prediction model based on the machine learning algorithm to obtain respective prediction results of the ingredients of the substance to be detected and a probability corresponding to the prediction result;
   if the probability of the prediction result is the maximum and exceeds a preset threshold, confirming the prediction result as the ingredient of the substance to be detected;
   or otherwise, using a common ingredient of a preset number of prediction results having relatively large probabilities in the respective prediction results as the ingredient of the substance to be detected.

4. The method according to claim 1, wherein the machine learning algorithm is an artificial neural network algorithm.

5. A detection device, comprising:
   at least one processor; and
   a memory in communication connection with the at least one processor; wherein
   the memory stores instructions executable by the at least one processor, and the instructions are executed by the at least one processor to enable the at least one processor to execute the method according to claim 1.

6. A non-transitory computer readable storage medium, wherein the non-transitory computer readable storage medium stores computer executable instructions, and when being executed by the detection device, the computer executable instructions cause the detection device to execute the method according to claim 1.

* * * * *